Apr. 10, 1923.
L. F. STAFFORD
AUTOMOBILE BUMPER
Filed Feb. 6, 1922
1,450,928
2 sheets-sheet 2
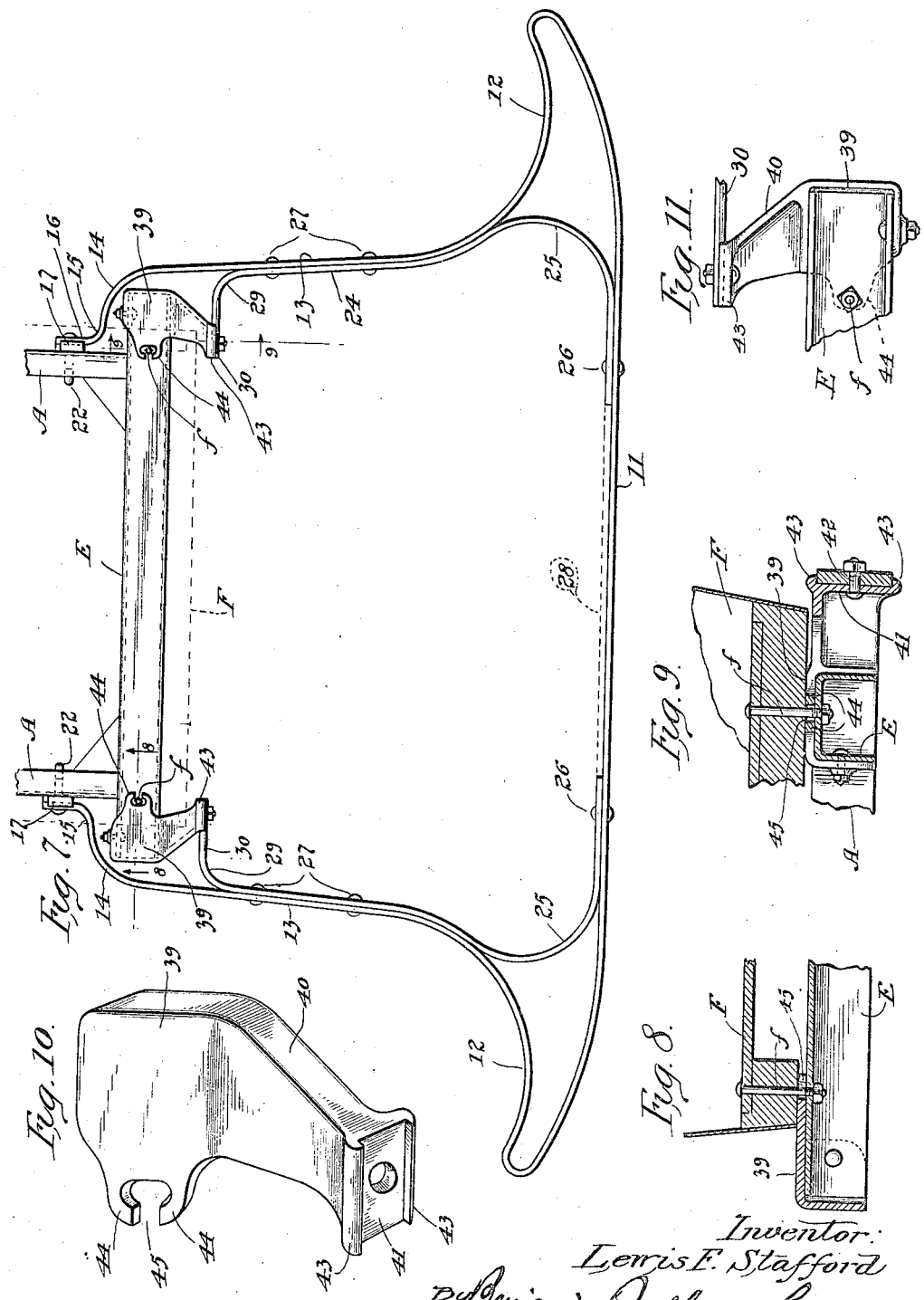
Inventor:
Lewis F. Stafford Patented Apr. 10, 1923.

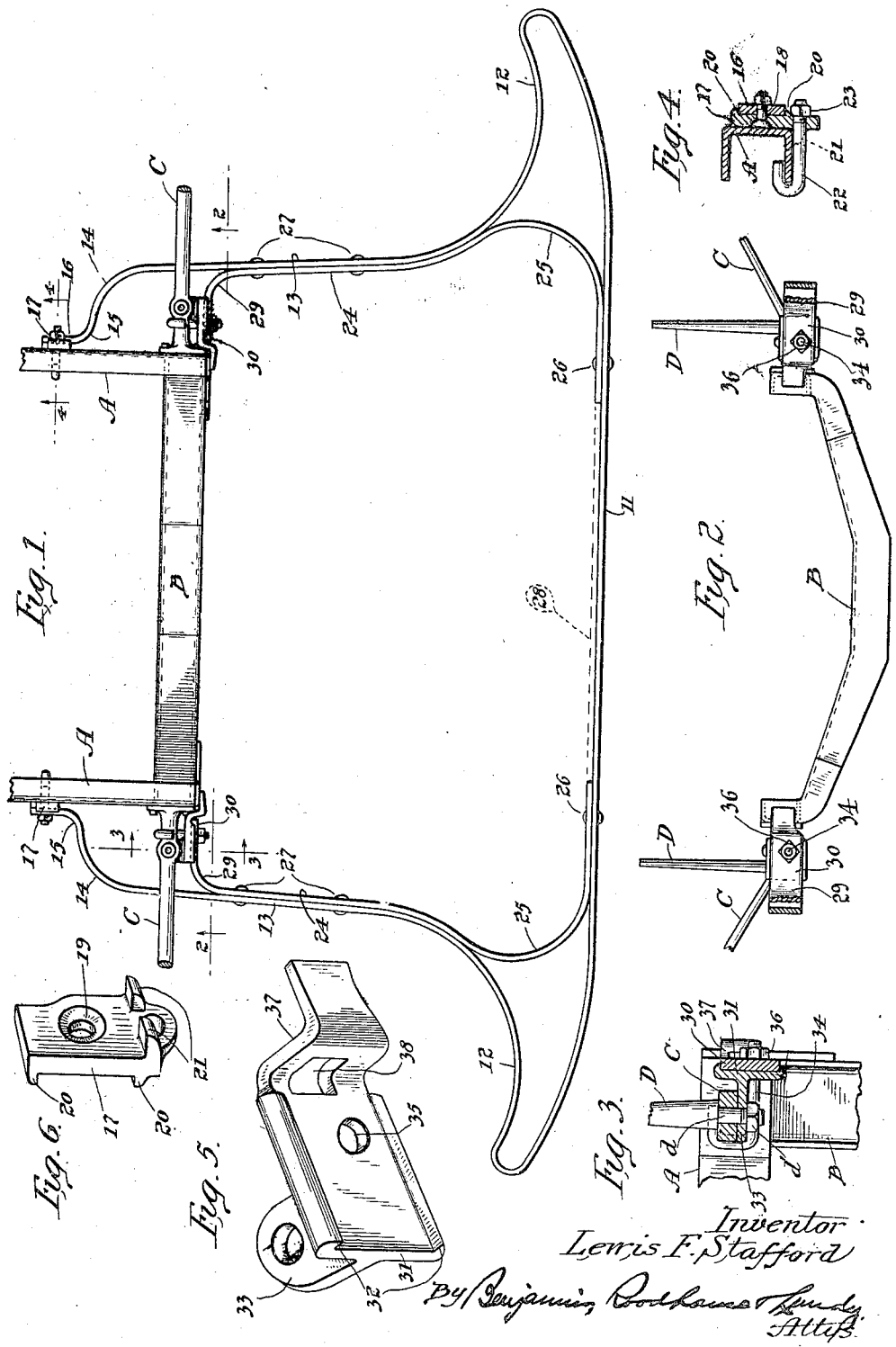

1,450,928

UNITED STATES PATENT OFFICE.

LEWIS F. STAFFORD, OF CHICAGO, ILLINOIS, ASSIGNOR TO STAFFORD SPRING GUARD CO., OF CHICAGO, ILLINOIS, A CORPORATION OF ILLINOIS.

AUTOMOBILE BUMPER.

Application filed February 6, 1922. Serial No. 534,581.

*To all whom it may concern:*

Be it known that I, LEWIS F. STAFFORD, a citizen of the United States, residing at Chicago, in the county of Cook and State of Illinois, have invented a new and useful Improvement in Automobile Bumpers, of which the following is a specification.

My invention relates generally to bumpers for automobiles and similar vehicles, and has been more particularly designed for application to the chassis or body or other parts of a Ford automobile.

The specific object of my invention resides in providing a bumper for a Ford automobile that may be quickly attached to the chassis or other part of the vehicle without any preliminary work upon the vehicle and without the necessity of using any special tools, and the device is so designed that the same shaped structure may be readily employed for both the front or rear of the vehicle by a simple selection of the brackets provided. Another object consists in the provision of a bumper that shall be extremely rigid as regards its attachment to the vehicle so that the tendency to loosen is reduced to a minimum, and in this connection I have designed the attaching brackets so that the arms of the bumper may be secured thereto when shipped from the manufacturer to the user who may then attach the structure to the vehicle in a few minutes. I have also designed the bumper so that the usual long reach of the attaching arms is divided by the employment of supplementary supporting arms that connect the impact portion of the bumper to the vehicle at points separate from the points of attachment of the bumper arms. Besides the usual yielding construction of the forward portions of the bumper arms, which are customarily in the form of spring bends between the impact portion of the bumper and the arms, I have provided additional yielding areas in the arms of the structure adjacent the points where the arms are secured to the vehicle, thereby increasing the flexibility of the entire bumper device. Further objects of my invention reside in the provision of novel attaching brackets that are secured to the vehicle by means of bolts and nuts already on the Ford automobile as standard parts thereof and which therefore permit of the securing of the bumper to the vehicle by persons having little or no mechanical skill; also to provide a bumper that is dependable in performing its functions, durable in construction and which is economical to manufacture so that it may be sold to the user for a moderate price. All the foregoing objects I prefer to accomplish by the means and in the manner hereinafter fully described, and as more particularly set forth in the appended claims.

The drawings, it will be understood, are merely diagrammatical for the purpose of illustration, and by referring thereto it will be seen:

Figure 1 is a plan of the front or forward portion of a Ford automobile chassis showing my bumper structure attached thereto.

Figure 2 is a front elevation thereof, the bumper being in section and taken on line 2—2, Figure 1.

Figure 3 is a vertical sectional view taken on line 3—3, Figure 1, and drawn to an enlarged scale.

Figure 4 is a view similar to Figure 3 taken on line 4—4, Figure 1, also enlarged.

Figure 5 is a detail in perspective of the bracket for attaching the supplementary supporting arms of the front bumper to the vehicle.

Figure 6 is a perspective view of the bracket for attaching the main bumper arms for both front and rear bumpers to the vehicle.

Figure 7 is a view similar to Figure 1 showing my bumper attached to the rear of the Ford automobile.

Figure 8 is a transverse vertical section on line 8—8, Figure 7 and drawn to an enlarged scale.

Figure 9 is a vertical sectional view taken on line 9—9, Figure 7, and also enlarged.

Figure 10 is a detail in perspective showing the bracket for securing the supplementary arms of the rear bumper to the Ford automobile.

Figure 11 is a bottom plan of the portions of the structure shown in Figures 8 and 9.

As hereinbefore stated, the bumper body is of the same construction for both the front and rear ends of the vehicle, hence the same description and reference characters will suffice for both types, and, for the purpose of convenience, the front or forward bumper and its attaching brackets will first be described.

Referring more particularly to Figure 1 of the drawings, it will be seen the bumper body is fabricated from lengths of strap or spring metal and consists of an impact member 11 that is preferably straight with the metal strip disposed upon edge or in a vertical plane and the length of this impact member is sufficient to extend across the width of the vehicle either at the front or rear thereof. At each end of the impact member the metal is given hair-pin bends or loops 12 and then extends inwardly toward the vehicle to provide arms 13 for attachment to the chassis or other convenient portions of the vehicle. In order to give these arms 13 additional flexibility over that acquired through the instrumentality of the hair-pin bends 12, and also to facilitate the attachment of the arms to the chassis side-sill A of the Ford automobile, I have provided the end portions of the arms with curved bends 14 of substantially quadrant shape which terminate in shorter bends 15 from which latter bends the metal extends in short straight stretches 16 in planes approximately parallel with the side sills A of the chassis. Suitable plates 17 are secured to stretches 16 by bolts 18 that pass through the same; said bolts having conical heads that fit countersunk apertures 19 in plates 17 so that the heads of the bolts will be flush with the faces of the plates that lie next to the vertical webs of the channel shaped side-sills A of the chassis. Parallel ribs or flanges 20 are formed upon the upper and lower portions of the plates between which the stretches 16 of the bumper arms are disposed in order to relieve bolts 18 of a considerable portion of the weight and lateral stress of the bumpers thereon, and the opposite faces of plates 17 have a pair of lateral lugs 21 or interrupted flanges providing shoulders against which the adjacent corners of side-sills A engage. In order to secure the plates and bumper arms to the side-sills suitable apertures are made in the lower portions of the plates through which hook-shaped bolts 22 are passed, the hooked ends thereof being engaged with the opposite edges of the lower flanges of the side-sills, as seen in detail in Figure 4 of the drawings, which bolts are tightened into position by turning down their nuts 23 upon their outer threaded ends that project outside plates 17.

For the purpose of giving the impact member 11 and arms 13 additional support and whereby the structure is rendered more rigid and less liable to vertical vibration, I have provided supplementary supports 24 in the form of arms that are connected at one end to impact member 11, and at their ends farthest therefrom are secured to brackets attached to the chassis structure adjacent the ends thereof, while the intermediate portion of said supplementary supports 24 extend parallel with and lie against the main bumper arms 13 to which they are secured. The outer portions of the supplementary supports extend face to face with arms 13 to points on the sweeps part way to the hair-pin bends 12 where said supplementary supports 24 are given reverse curves 25 of short circular shape to and meet impact member 11, as shown in Figures 1 and 7 of the drawings, and are secured to the impact member by bolts or rivets 26. Bolts or rivets 27 likewise secure the opposite portions of the supplementary supports to arms 13 of the bumper body, and if desired, the supplementary supports may be made of one continuous strip of metal in which event the intermediate or connecting portion 28 will be disposed parallel with and alongside impact member 11, as seen in dotted lines.

At the forward end or front of the chassis of the Ford automobile, the side-sills are connected by a drop-frame end sill B and extending laterally from the ends of the side-sills in an upwardly inclined direction is the mud-guard or fender bracket C that has a vertically disposed lamp bracket or standard D arising therefrom. From the lower end of the lamp bracket extends a threaded stud $d$ of reduced diameter that passes through an aperture in the fender bracket and is secured in place by a nut $d'$ secured onto its extended end, and, as seen in Figures 1 and 3, I utilize this structure for securing the adjacent ends of the supplementary supports to the chassis. At their ends nearest the chassis the supplementary supports are given curved spring bends 29 that terminate in straight portions 30 extending inwardly towards each other and laterally to the straight portions of the supplementary supports. The brackets for securing these elements to the vehicle are illustrated in Figure 5 and comprise a straight plate 31 having upper and lower flanges or ribs 32 that form a channel to receive the portions 30 of the supports, while the opposite faces of said plates have apertured lugs 33 through which studs $d$ of lamp brackets D are passed after removing nut $d'$. Upon replacing and tightening the nuts the lamp brackets and the bumper attaching plates 31 are secured in position. The shanks of hook-shaped bolts 34 are passed through apertures 35 in the plates and alining apertures in portions 30 of supports 24 and after the curved ends of these bolts have been hooked around the fender-brackets C, nuts 36 are tightened upon the threaded shanks of the bolts which secure portions 30 to the plates and affords additional means for securing said plates 31 to fender brackets C. Substantially L-shaped extensions 37 are provided upon the ends of plates 31 adjacent the chassis sills, the lateral members thereof that fit against the sides of the chassis or fender brackets C having rectangular apertures 38 to fit around bolts or nuts that secure said fender-brackets to the chassis, while the other members of the L-shaped extensions are drawn against the ends of the chassis by the tightening of the hook-bolts 34, as shown in Figure 1 of the drawings.

The bumper for the rear of the automobile is of the same shape and dimensions as that used for the front thereof, the bends and curves being made upon the same patterns or forms, and the same plates 17 as illustrated in detail in Figure 6 are used to attach the straight end portions 16 of the bumper to the rear portions of side-sills A. Hence, I have designated all of said corresponding parts by the same reference characters that have heretofore been employed in describing the respective elements. The brackets for connecting the straight lateral ends 30 of the supplementary supports to the chassis are, however, different in construction from that employed at the front of the vehicle, owing to the absence of the fender brackets at these points, but said rear brackets perform their functions in substantially the same manner as plate 31 with their L-shaped extensions 27 in that they extend upon the sides and ends of the corners of the chassis sills so that the blows received by the impact member 11 will be transmitted through main arms 13 and the supplementary supports 24 longitudinally to the side-sills respectively at their sides and at their ends.

At the rear of the Ford chassis the side-sills A are connected by a channel end-sill D having its ends extended beyond the ends of the side-sills and with its web uppermost in a horizontal plane, one flange having cut-away portions to arch over the side-sills and the body F of the vehicle is connected to this end sill by bolts f that pass through these parts and secured in place by nuts. The bracket for connecting the straight portions 30 to the chassis comprises a casting, the chassis-engaging portion of which is a box-like structure 39 having the bottom and one vertical side wall removed so that it may be fitted over the extended ends of end-sills E. An arm 40 of angular cross-section extends obliquely rearwardly from end-sill E, and at the end of the arm the flanges thereof are connected by a transverse plate 41 of rectangular shape that is apertured to receive a bolt 32 that passes through the same and an alining aperture in the adjacent part of the straight portion 30 of the supplementary support. Upper and lower ribs or flanges 43 extend from the outer face of plate 41 between which the metal strap forming portion 30 is positioned. A laterally disposed horizontal ear 44 projects from the upper or top wall of the box-like portion 39 of the bracket in the outer edge thereof is provided an open slot 45 which is preferably wider at its inner portion.

In assembling the bracket with the chassis the nut on the body bolt f is loosened and body F raised a short distance from the chassis whereupon the box-like portion 39 of the bracket is slipped upon the end of end-sill E with the open side of the box innermost which positions the shank of body bolt f in the inner portion of slot 45. The body is then lowered to position and the nut tightened on the bolt which clamps the top of the box between the body and the end sill, as seen in Figures 8 and 9 of the drawings. This arrangement permits of a very rigid mounting of the bracket, and the walls of box 39 surrounding the end of sill E prevent the shearing of bolt f due to excessive stresses received from the impact portion of the bumper. Also the structure permits the bumper being quickly assembled with the vehicle without the use of special tools other than a wrench to operate the nut on the body bolt f.

What I claim new is:

1. A bumper comprising an impact member extending across the end of a vehicle, spring arms at the ends of said impact member, and a supplementary supporting arm adjacent each end of said impact member and extending therefrom toward the vehicle, said spring arms and said supplementary supporting arms secured to the vehicle at different locations upon the respective sides of the vehicle and each provided with a yieldable bent portion adjacent their means of attachment to the vehicle.

2. A bumber comprising an impact member extending across the end of a vehicle, spring arms at the ends of said impact member, a supplementary supporting arm adjacent each end of said impact member and extending therefrom to approximately the end of the vehicle, and means for securing said arms to the vehicle, said spring arms and said supplementary supporting arms being each provided with a yieldable bent portion adjacent the means of attachment to the vehicle.

3. A bumper comprising an impact member extending across the end of a vehicle, and outwardly and rearwardly extending spring arms at the ends of said impact member, said arms being spaced wider than the width of the vehicle chassis and provided with spring bends at their ends farthest from said impact member that provide lateral members extending inwardly toward the side of the vehicle chassis.

4. A bumper comprising an impact member extending across the end of a vehicle, arms at the ends of said impact member and extending therefrom towards the vehicle, and supplementary supporting arms extending from said impact member toward the vehicle and provided with spring bends at their ends farthest from said impact member.

5. A bumper comprising an impact member extending across the end of a vehicle, arms at the ends of said impact member and extending therefrom towards the vehicle, and supplementary supporting arms extending from said impact member toward the vehicle; said supplementary supporting arms provided with yielding portions adjacent their attachment to the impact member and having spring bends at their ends adjacent the vehicle.

6. A bumper comprising an impact member extending across the end of a vehicle, arms at the ends of said impact member and extending therefrom toward the vehicle, and supplementary supporting arms extending from said impact member toward the vehicle, the intermediate portions of said supplementary arms being disposed alongside said bumper arms and provided with spring bends at their outer and inner end portions whereby yielding areas are provided therein between the bumper arms and the impact member and between the bumper arms and the points of attachment of the supplementary supporting arms.

7. The combination with a vehicle chassis having longitudinal side sills and a connecting member at the ends thereof, of an impact receiving member having arms extended to and secured to said sills, supplementary supporting arms extended from the impact member to adjacent the sill connecting member, and brackets secured to the chassis and connected at their outer portions to the adjacent ends of the supplementary arms, said brackets each having a portion that engages the outer face of the end of the chassis whereby the stress received by said arms is transmitted longitudinally to said side sills.

8. The combination with a vehicle chassis including side-sills and an end connecting member, of a bumper having arms secured to the side-sills back of their ends, supplementary bumper arms terminating adjacent said connecting member, and brackets to which the ends of the supplementary arms are connected; said brackets mounted upon an adjacent portion of the chassis and each having a projecting element that engages the end of the chassis.

Signed at Chicago, county of Cook and State of Illinois, this 10th day of December, 1921.

LEWIS F. STAFFORD.